United States Patent [19]
Sarraf

[11] Patent Number: 6,157,812
[45] Date of Patent: Dec. 5, 2000

[54] SYSTEM AND METHOD FOR ENHANCED SATELLITE PAYLOAD POWER UTILIZATION

[75] Inventor: Jamal Sarraf, Irvine, Calif.

[73] Assignee: Hughes Electronics Corporation, El Segundo, Calif.

[21] Appl. No.: 08/944,879

[22] Filed: Oct. 6, 1997

[51] Int. Cl.[7] .................................................. H04B 7/185
[52] U.S. Cl. .................... 455/13.4; 455/13.3; 370/318; 370/316
[58] Field of Search .................... 455/13.3, 13.4, 455/12.1, 427, 428, 429, 430; 342/353, 352; 370/316, 326, 318, 311

[56] References Cited

U.S. PATENT DOCUMENTS

| | | | |
|---|---|---|---|
| 4,009,345 | 2/1977 | Flemming et al. | 179/15 |
| 5,550,550 | 8/1996 | Das | 342/353 |
| 5,818,385 | 10/1998 | Bartholomew | 342/372 |
| 5,832,379 | 11/1998 | Mallinckrodt | 455/427 |
| 5,878,329 | 3/1999 | Mallinckrodt | 455/69 |
| 5,940,753 | 8/1999 | Mallinckrodt | 455/422 |

FOREIGN PATENT DOCUMENTS

0762637 A2  8/1996  European Pat. Off. .
63-185129A  1/1987  Japan .

*Primary Examiner*—Fan Tsang
*Attorney, Agent, or Firm*—Bradley K. Lortz; Vihayalakshmi D. Duraiswamy; Michael W. Sales

[57] ABSTRACT

Systems and methods for improved use of idle power of each satellite repeater/transponder during low-traffic periods improve the overall link performance in multi-carrier, demand-assigned satellite communication systems through dynamic control and allocation of additional power to all signal carriers passing through each repeater when the total traffic load in the repeater is below a threshold. For satellite systems already in operation, the invention can be implemented and integrated into the existing feeder earth stations. For new systems, the invention can be implemented and integrated into the transmit section of individual satellite repeaters/transponders. The invention can be applied to new satellite systems to directly reduce the required satellite payload power for a given mission, thus substantially lowering the cost of the space segment. For existing systems, the benefits may be applied toward increasing the total number of carriers supported by the system, increasing the average quality and availability for the downlinks, increasing the system coverage and service area, or any combination thereof.

11 Claims, 4 Drawing Sheets

SYSTEM AND METHOD FOR ENHANCED SATELLITE PAYLOAD POWER UTILIZATION

TECHNICAL FIELD

The present invention relates generally to communication systems, and more particularly, to satellite communication systems.

BACKGROUND ART

Satellite communication systems are widely used to support video, voice and data communication services all over the world. In recent years such services are being delivered to the individual end-user directly via small fixed or mobile terminals on a point-to-point basis.

Handheld mobile terminals, and other ultra-small aperture personal terminals are expected to be widely used with all types of satellite systems for mobile and fixed telephony, data/fax, interactive bandwidth-on-demand, and multimedia applications.

All such satellite systems rely on the use of any one or a combination of single channel per carrier (SCPC), time-division multiple-access (TDMA) or code-division multiple-access (CDMA) transmission technologies. Such systems result in transmission of a large number of signal carriers in a frequency-division multiple-access (FDMA) arrangement, and on a demand-assigned multiple-access (DAMA) basis. In these systems each user is allowed to access and use the system only when the user has a need, and even then the system resources are assigned to the user based on demand. From the perspective of a satellite communication system, users do not have a dedicated full-time transmission channel but rather share such channels with other users. Moreover, signal transmissions from end-user terminals to the satellite do not need to occur unless there is information to be transmitted.

Examples of such satellite communication systems include geosynchronous (GSO) and non-geosynchronous (NGSO) earth orbit systems which are being deployed for mobile and fixed telephony applications, in addition to the new wide-band systems for bandwidth-on-demand and point-to-point multimedia services. To meet the business requirements for high-capacity and wide-area coverage capabilities, most such systems employ a large number of very high-gain spot beams.

In general, communications satellites can cover a large geographical area via a single or several communications beams (reaching even a few hundred beams in some cases). The total available radio frequency spectrum for each satellite beam is generally broken up into a number of smaller channels. Each radio frequency channel can be used, based on many system design objectives, to carry signals using any of the three transmission technologies (SCPC, TDMA, or CDMA) noted above. In demand-assigned systems, transmission of the signal carrier by each user terminal in any channel is managed by a central system controller. The power level of each carrier, and how much of the satellite downlink power is used by that carrier, is determined by many system parameters but is generally fixed once it is determined. However, such systems typically employ uplink power control to compensate for propagation anomalies so that the signal level received at the satellite is relatively constant.

On board the satellite, each downlink beam carries signals from one or more payload repeaters. Repeaters may be of the bent-pipe (transponder) or regenerative types, using analog or digital signal processing technologies. Each repeater may have a dedicated high-power amplifier (HPA) or share a hybrid-matrix amplifier assembly with other repeaters. Each repeater may also be assigned to a single signal carrier or be used to support several carriers. All such high-power amplifier assemblies supporting multiple carriers are operated in a linear mode.

The total downlink power of each satellite is divided among its repeaters based on the projected traffic capacity of each repeater. With bent-pipe designs, the repeater power is also pre-allocated to each carrier based on a maximum number of such carriers the repeater must support. In other words, a predetermined portion of the repeater power is always reserved for each signal carrier whether or not that carrier is actually present. With regenerative designs, where user traffic through each repeater is generally multiplexed into a single downlink time-division multiplexed (TDM) carrier, the repeater power is fully utilized at all times regardless of traffic volume. This guarantees the availability of power to each carrier (or user data burst) during heavy traffic periods when each repeater is expected to be loaded at its maximum capacity. However, as with all demand-assigned multiple-access transmission techniques, the peak system loading occurs only during a small fraction of the daily or periodic operations. Moreover, the peak traffic loading for each repeater usually occurs a few years after the system start when the full population of user terminals are deployed and operational.

As such, satellite based communication systems are deployed with a capacity to support a system which generally reaches its maximum traffic loading several years later. Even then, the full payload power of each repeater is utilized only for a small fraction of the time during the peak daily traffic hours. For all other times, the power of each repeater is reserved for many channels or carriers which are not active. Recognition of this gross under-utilization of the expensive satellite payload power provides significant opportunity for improvement as accomplished by the present invention.

SUMMARY OF THE INVENTION

Accordingly, it is an object of the present invention to provide a system and method for more efficient utilization of the power for each satellite repeater/transponder during low-traffic periods to improve the overall performance of the system in a multi-carrier, demand-assigned satellite communication system. In such systems, the satellite payload is generally made up of a number of non-regenerative (bent-pipe), repeater sections where each repeater processes the active signal carriers present within a particular portion of the satellite frequency spectrum. Such repeaters operate in a linear mode where the amount of downlink power of each signal carrier (as received at the satellite) is directly proportional to the level transmitted by a ground station. Such systems may also employ uplink power control to compensate for various propagation anomalies and maintain a relatively constant signal level.

It is a further object of the present invention to provide systems and methods for enhancing the utilization of satellite power, dynamically and automatically, by allocating the power of each repeater among the signal carriers passing through it in accordance with current traffic loading conditions. As such, during low-traffic periods each carrier receives a certain additional amount of downlink power (compared to the lower full-load value) resulting in a substantial improvement in system performance.

The present invention can be implemented as either a ground-based system or a satellite-based system. For existing satellite systems (already launched and operational), the present invention can be integrated into the existing ground equipment infrastructure. For new systems, the present invention is preferably implemented as part of the satellite payload itself.

In carrying out the above objects and other objects and features of the present invention for a ground-based implementation, a system for controlling the power level of uplink carriers is provided to improve the utilization of satellite repeater power. The system is implemented as a dynamic carrier power allocation (DCPA) assembly at each feeder earth station or alternatively integrated with the satellite payload of a communication network. The DCPA assembly includes DCPA-driver amplifier modules and associated circuitry which is inserted before the upconverter and high-power amplifier (HPA) assembly within the ground station. At each feeder station the DCPA assembly collects and groups all the out-going intermediate-frequency (IF) carriers assigned to the same satellite repeater into one composite signal. A DCPA-driver amplifier controls the level of each composite IF signal in accordance with the current total loading of each repeater. Each DCPA driver amplifier associated with one of the IF signals has a controllable gain function. For satellite communications systems employing a single feeder earth station, the gain-control function of each driver amplifier is preferably performed automatically. When the total traffic loading for a repeater is above a predetermined or adjustable threshold, the associated driver amplifier automatically selects a gain position that corresponds to a zero relative gain with respect to the nominal value needed for 100% full-load conditions, i.e. no additional gain or boost is provided. When the loading is below the threshold, the driver amplifier automatically selects a fixed gain point which is a predetermined amount above the zero-relative gain, i.e. the gain is increased based on reduced system loading for that particular repeater. The driver amplifier operates in this gain position while the traffic loading is below the threshold point. In this manner, all active carriers passing through the amplifier receive a fixed boost to their power levels. This in turn results in a corresponding increase when the carriers pass through the HPA assembly of the feeder earth station. The increased uplink level results in a corresponding increase to the downlink power of each affected carrier passing through the satellite repeater which results in improved power utilization to enhance system performance.

A method is also provided to improve power utilization and increase efficiency for communication systems where multiple feeder earth stations are employed, all of which may load the same satellite repeaters. The method controls the aggregate power level of uplink signals in a similar manner as that described above for the single earth feeder station implementation. However, where multiple earth feeder stations are employed, the gain-control function of each DCPA-driver amplifier is determined by a Network Demand-assigned multiple-access Control Center (NDCC). The NDCC centrally manages the overall or aggregate traffic assignment and loading of each satellite repeater through its interactions with all of the feeder earth stations. Thus, the NDCC is aware of the total loading of each satellite repeater imposed by all of the feeder earth stations and selects a common gain position for the DCPA-driver amplifiers of all feeder earth stations accordingly. The NDCC preferably communicates with each feeder station at all times to perform this function.

The present invention groups individual user carriers based on the intended satellite repeater rather than grouping by user location as in the prior art systems. After grouping according to the intended repeater, each composite IF signal is passed through a DCPA driver amplifier module for level control as described above. The output of all the DCPA driver amplifier modules are then combined into a single composite signal and fed to the upconverter-HPA subsystem as in the existing systems. The particular DCPA configuration is determined on a case-by-case basis depending on the configuration details of the existing network. Generally, the DCPA configuration includes a number of DCPA driver amplifier modules, signal dividers, band-pass filters, and combiners as explained in greater detail below.

For all new systems, the present invention may be implemented as part of each satellite repeater in the form of a DCPA-Driver amplifier replacing the traditional driver amplifier which precedes the HPA unit for the repeater. In such systems the DCPA-Driver amplifier automatically controls the gain as described with respect to the single-feeder station case for a ground-based implementation.

The present invention has a number of advantages relative to the prior art systems and methods. The present invention better utilizes the downlink power of repeaters under all loading conditions resulting in an increase in the downlink power for each carrier under reduced traffic loading conditions. This increase in downlink power results in a corresponding increase in the downlink margin. As a result, the communication link has a higher availability when compared to the link availability achievable under the lower fixed power systems of the prior art. To achieve the same higher average link availability using traditional methods, more downlink power would have to be allocated to each carrier resulting in an increase in the total required repeater power and therefore the total satellite power at additional cost, if available at all. Thus, the present invention is analogous to an increase of the satellite power which is manifested in various system benefits to improve overall system performance—without the attendant disadvantages of increased cost and weight.

For new systems, the resulting benefits of the present invention can be directly applied to reduce the required satellite payload power for a particular mission thereby resulting in reduced costs. For existing systems, advantages of the present invention include increasing the total number of carriers supported by the system (if additional frequency spectrum is available), increasing the average link margin and availability of communications services, increasing the system coverage and service area (when combined with an upgrade of the radiated power of the end user stations), or any combination thereof as determined by the system owner and operator.

The above objects and other objects, features and advantages of the present invention will be readily appreciated by one of ordinary skill in the art from the following detailed description of the best modes for carrying out the invention when taken in conjunction with the accompanying drawings.

BEST MODE FOR CARRYING OUT THE INVENTION

Figure 1:
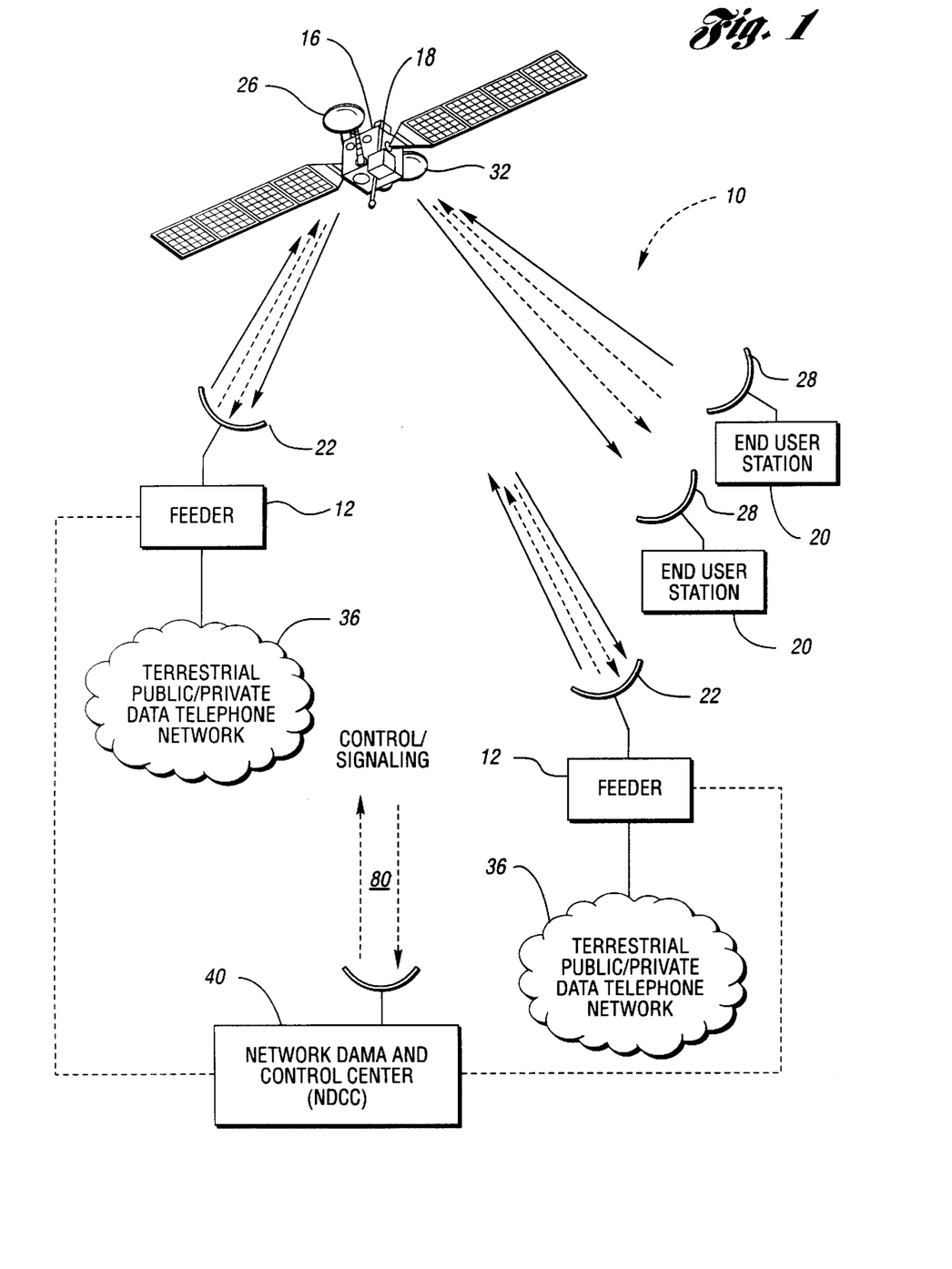
FIG. 1 illustrates a general configuration for a satellite communication system with which the present invention may be integrated.

Referring to FIG. 1, a satellite communication system 10 is illustrated. Satellite communication system 10 includes a plurality of feeder earth stations 12 located on Earth. Feeder earth stations 12 transmit signals to a satellite 16 in an orbit around Earth. Satellite 16 includes at least one repeater 18 which receives signals from feeder earth stations 12, processes the signals, changes their frequency, and transmits the signals to one or more end user stations (EUS) 20 located on Earth. Satellite 16 may transmit signals using a single beam or multiple beams each supported by a single or an aggregate of repeater sections depending upon the particular application.

Feeder earth stations 12 are preferably fixed in location. End user stations 20 may be fixed, portable, or mobile. Each feeder earth station 12 has an antenna 22 for transmission of signals via carriers of suitable frequencies to a receiving antenna 26 of satellite 16. Each end user station 20 has an antenna 28 for reception of the signals transmitted via suitable carriers from a transmitting antenna 32 of satellite 16. In most applications, the same antenna may be used for both transmitting and receiving signals.

One or more repeaters 18 (best illustrated in FIG. 2) are connected between receiving antenna 26 and transmitting antenna 32. The present invention may be used in a variety of communication applications. For example, satellite communication system 10 may be employed for the transmission of telephonic and data signals. Private or public telephone and data networks 36 may connect with one or more of feeder earth stations 12. A network DAMA and control center (NDCC) 40 may be used to monitor and control the communications traffic of feeder earth stations 12 as explained in greater detail below.

Figure 2:
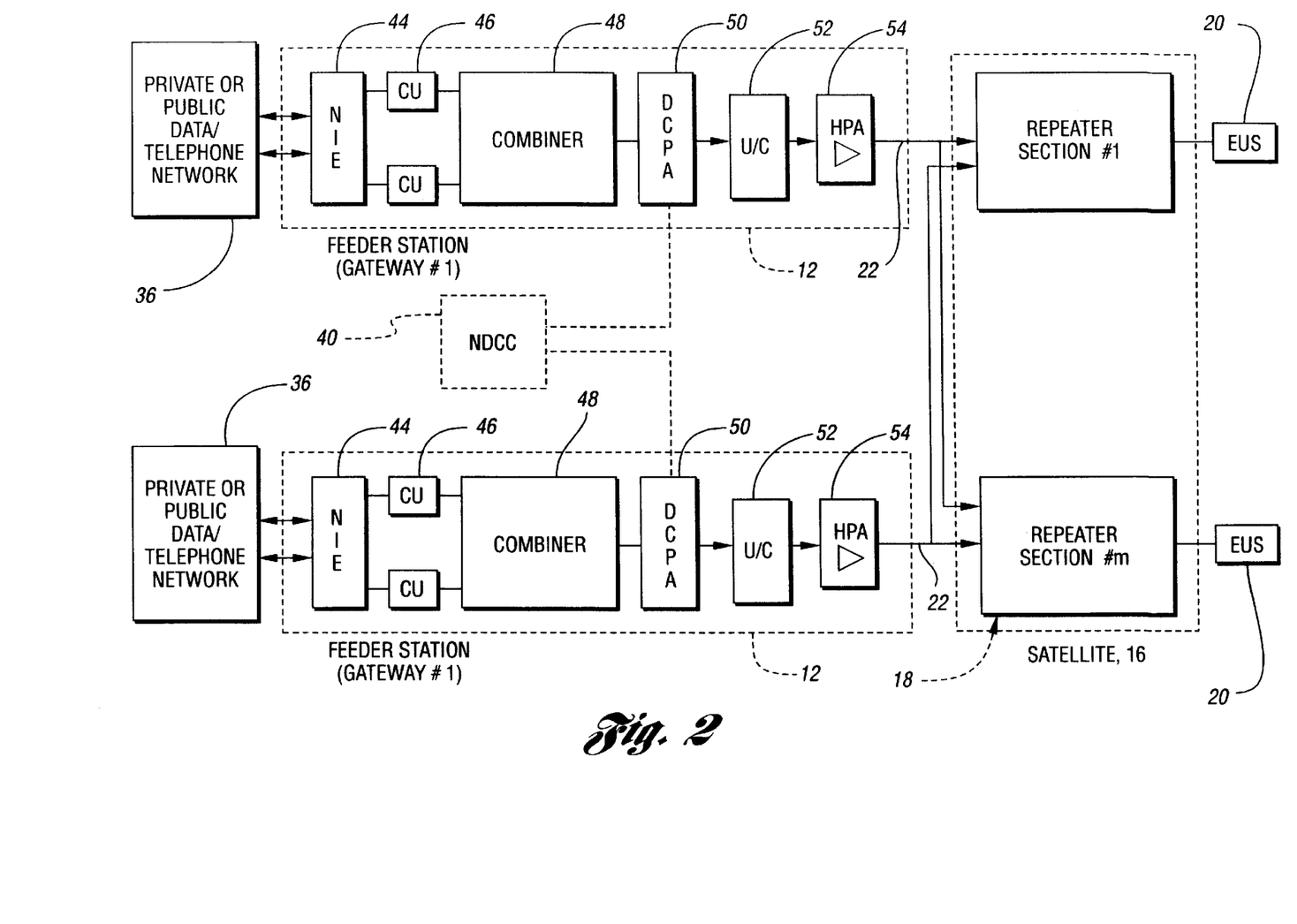
FIG. 2 is a block diagram representation showing integration of DCPA assemblies into feeder earth stations according to the present invention for a ground-based implementation.

Referring now to FIG. 2, a block diagram of various components of communication system 10 illustrates use of Dynamic Carrier Power Allocation (DCPA) according to the present invention. Preferably, satellite communication system 10 uses a multi-carrier per repeater, demand-assigned transmission architecture. All signal carrier frequency/channel assignments to feeder stations 12 and end-user stations 20, in addition to system loading, are managed and controlled by NDCC 40. Communication system 10 may have only a single feeder earth station 12 in which case NDCC 40 functionalities may be incorporated into the feeder earth station.

Feeder earth stations 12 transmit signals to end user stations 20 via one or more repeater sections 18 (numbered one through "m") of satellite 16. Satellite 16 receives uplink signals via receiving antenna 26 and allocates them to one or more repeater sections 18 based on the carrier frequency of the signal. Each repeater section 18 converts the signals to a downlink frequency and may use a fixed gain amplifier to prepare the signal for retransmission via one or more beams to end user stations 20. One of ordinary skill in the art will recognize that the blocks representing satellite repeaters 18 as shown in FIG. 2 are only functional representations for convenience and ease of illustration. Of course, in practice many payload subsystems, including receive and transmit antennas, receivers, HPA assemblies, and the like, could be shared by several conceptual repeaters.

Where more than one feeder earth station 12 is employed in communication system 10, traffic loading coordination among feeder earth stations 12 is provided by NDCC 40. Each feeder earth station 12 includes Network Interface Equipment 44 through which feeder earth stations 12 interface with network 36. Each feeder earth station 12 further includes a plurality of channel units (CU) 46. Channel units 46 process and modulate user information signals into intermediate-frequency (IF) signals for transmission, in addition to demodulating received IF signals to recover user information. As such, the number of channel units 46 in operation and active at any particular time depends upon the traffic loading of communication system 10. During off-peak hours, only a few of channel units 46 will actually be active at any one time.

Signal carriers from feeder earth stations 12 corresponding to channel units 46 are transmitted to satellite 16 and after reception are passed to various repeater sections 18. Each channel unit 46 is dynamically assigned by NDCC 40 to work through a designated repeater section 18 according to a predetermined carrier frequency plan. Feeder earth stations 12 further include a signal combiner 48, coupled to channel units 46, for combining the modulated IF signals. The combined or composite signal is communicated to Dynamic Carrier Power allocation (DCPA) assembly 50, an upconverter (U/C) 52, and a high-power amplifier (HPA) 54.

Figure 3:
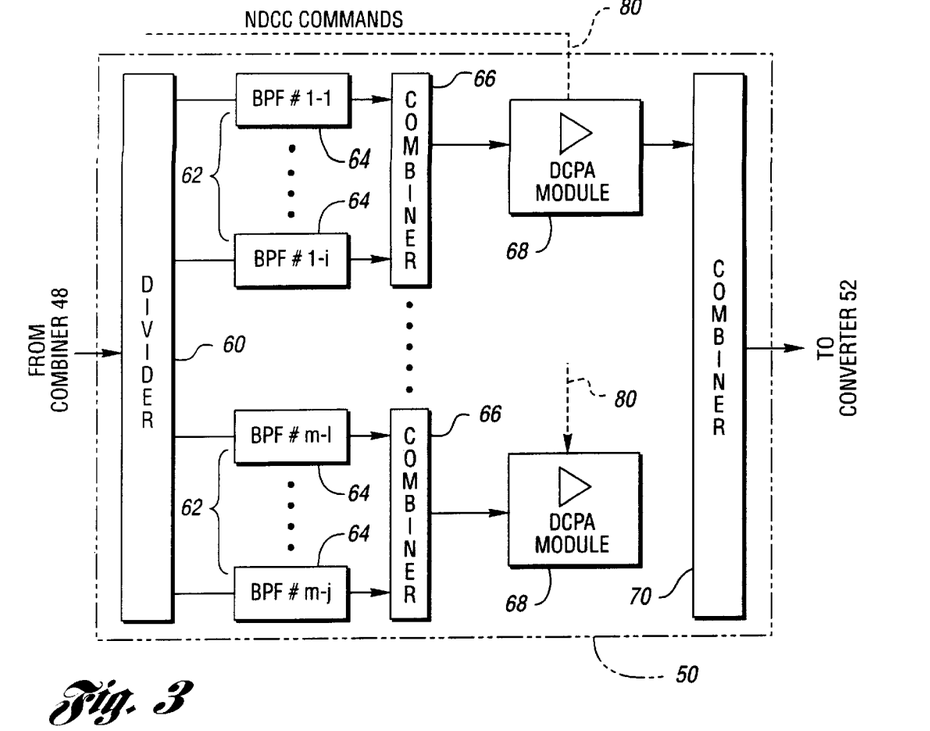
FIG. 3 is a block diagram illustrating details of a Dynamic Carrier Power Allocation (DCPA) Assembly for a ground-based implementation of the present invention.

FIG. 3 illustrates a generic block diagram for implementation of the DCPA system and method according to the present invention for satellite systems that have already been deployed and are in operation. One embodiment of the present invention may be implemented by the integration of DCPA Assembly 50 into the feeder earth station(s) as shown. DCPA Assembly 50 includes a power divider or splitter 60, a plurality of sets 62 of band pass filters 64, a plurality of signal combiners 66, a plurality of DCPA modules 68, and a signal combiner 70.

In operation, the combined IF signal from combiner 48 (FIG. 2) is divided by power divider 60 among band pass filters 64. Within a feeder earth station 12, the passbands of filters 64 differ from each other so that each band pass filter 64 separates a portion of the total IF spectrum, in effect separating a number of the individual IF carriers. As such, the plurality of filter groups 62 separates and groups together all those IF carriers (component signals) which will be retransmitted by the same satellite repeater section 18. Combiners 66 combine the outputs of all the associated band pass filters 64 of a filter set 62 corresponding to a particular repeater section 18 to form a composite IF signal. Filters 64 are labeled 1—1 through 1-j, and m-1 through m-j, where the first number represents a designated repeater section and the second number represents the particular spectral band of the filter.

The output of each combiner 66 (i.e, composite IF signal for a particular repeater) will vary depending upon the number of active channel units 46 designated for a particular repeater section 18. After being combined by a corresponding signal combiner 66, each composite IF signal is amplified by a corresponding DCPA module 68 described in greater detail with reference to FIGS. 4 and 5. For systems with a single feeder earth station, DCPA modules 68 operate autonomously to control the gain applied to the signals based on the current loading of each repeater section. For systems with multiple feeder stations, DCPA modules 68 operate under the control of the system NDCC through commands 80 as explained in greater detail with reference to FIG. 4.

Output signals of DCPA modules 68 are then combined by combiner 70 to produce another composite IF signal which is applied to upconverter 52 and high power amplifier 54 (best illustrated in FIG. 2). Preferably, HPA 54 operates in a multi-carrier, linear mode to amplify the resulting composite signal (composed of multiple IF signals) to a power level suitable for transmission via antenna 22 to one or more repeaters 18 of satellite 16. Each repeater 18 receives a portion of the uplink signals having frequencies falling within its predetermined frequency range. The signals are then amplified and converted to downlink frequency signals for re-transmission via antenna 32 to end user stations 20. Other than the modifications to implement the DCPA as described above, the remaining functions of the feeder stations are performed in the traditional manner.

In the prior art communication systems, every IF signal from every channel unit in each feeder earth station is treated equally and is allocated a fixed amount of power amplification from the HPA's regardless of how many other carriers are present at the time. The end-to-end link through each satellite repeater is engineered accordingly to deliver the required performance as if each repeater is 100% loaded with traffic so the repeater power would be fully exhausted. When the traffic loading is not at 100%, each carrier still transmits to the satellite with the same fixed level. Being a linear channel end-to-end, only a fraction of the repeater power in proportion to the number of uplinked carriers is utilized, with the remainder of the power being left idle.

According to the present invention, each DCPA module 68 (in a system with a single feeder earth station) monitors the loading condition of its associated repeater and automatically chooses its operating gain position accordingly. For best system performance the DCPA module is preferably implemented with a bi-modal gain capability. A first operating point corresponds to a loading range between a predetermined DCPA threshold and a point representing 100% loading. This point may be referred to as the zero relative gain point because the present invention preferably provides no additional gain when loading is within this range. While the traffic loading is below the DCPA threshold, a fixed relative gain is applied to all signals assigned to that particular repeater. To avoid operational degradations, the DCPA threshold level should preferably be kept within a range of about 40–70% of the full loading conditions. For any particular operating point, the DCPA module operates like a fixed-gain amplifier. As long as the transponder/repeater loading conditions are below the threshold level, the DCPA module increases the level of every associated carrier by a selectable constant DCPA gain amount, regardless of the actual level of the total loading.

As an example, with a DCPA threshold value of 50%, the DCPA module will provide a fixed relative gain, such as 3 Db, when the total loading in a particular repeater is below 50% of its maximum value. This additional gain will be provided as long as the total loading stays below the DCPA threshold level (50% in this example). As such, the DCPA module increases the level of every associated IF signal by a fixed 3 dB amount. This increase will directly result in a corresponding 3 dB increase in power by the associated HPA which transmits the carriers to the satellite. For non-regenerative satellite payloads, this in turn will drive the repeater proportionately higher and result in a 3 dB increase in the transmitted power of the downlink for each carrier. When the traffic loading for the associated repeater exceeds the threshold level, the DCPA module returns to the zero relative gain operation which corresponds to the gain for full load conditions. In this manner the DCPA module of the present invention imparts at least some (or all) of the unused transponder power to the signal carriers present to improve system performance.

Figure 4:
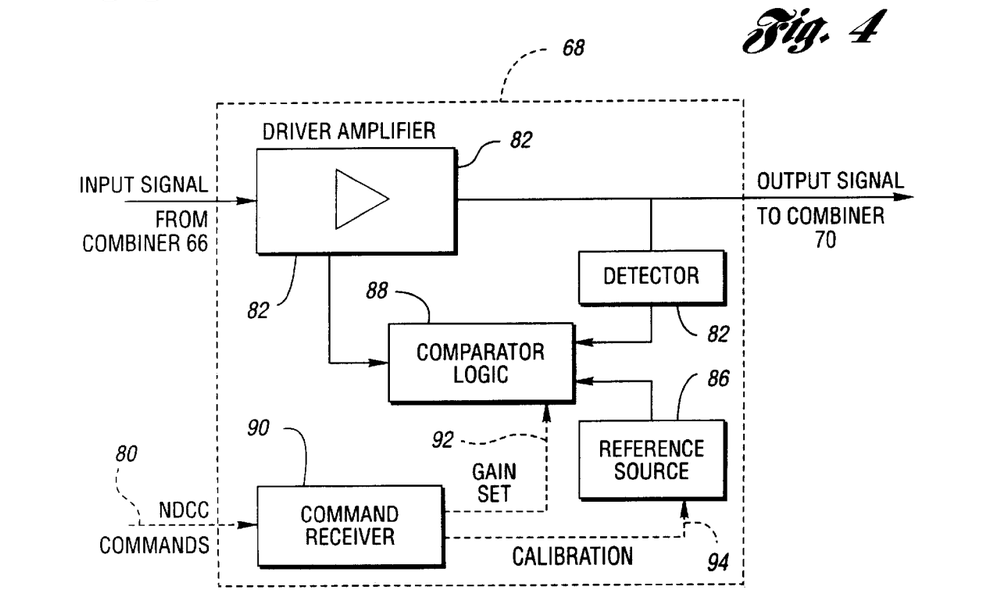
FIG. 4 is a block diagram illustrating a DCPA-driver amplifier module according to the present invention.

FIG. 4 is a functional block diagram illustrating a DCPA module according to the present invention. The DCPA module illustrated may be used in both ground-based and satellite-based applications. DCPA module 68 includes a selectable-gain amplifier 82 which receives its input from one of the signal combiners 66. DCPA module 68 also includes a detector 84, a reference signal source 86, comparator logic 88, and a command receiver 90. The composite input signal from combiner 66 represents one set of signal carriers passing through a particular satellite repeater which is amplified by amplifier 82, the output of which is continuously sampled by detector 84. The output of detector 84 is applied to comparator logic 88 which compares it to a reference value generated by reference source 86. The reference value preferably represents the 100% traffic loading conditions for the associated repeater. The reference value may be modified by a calibration 94 generated by command receiver 90 in response to a an NDCC command 80 for those systems utilizing multiple feeder stations and a NDCC. Comparator logic 88 determines its output based on the inputs from detector 84 and reference source 86 according to a loading algorithm based on the particular application.

Preferably, before any one of the satellite repeaters is put into service, power is applied to the associated DCPA modules (whether part of the repeater on the satellite or part of the feeder earth station on the ground). After performing a self-test and initialization, the DCPA module is configured for an appropriate full-load (zero relative) gain and DCPA threshold gain based on a predetermined DCPA threshold loading value. Because there is no traffic (and therefore no input signal from combiner 66), there is also no output from DCPA amplifier 82. Detector 84 gives a no-output value to comparator logic 88 which compares this signal with the output from reference source 86. Since the traffic loading is below the DCPA threshold, comparator logic 88 selects the DCPA threshold gain as the initial operating state for amplifier 82. For most systems the relative gain applied when the traffic is below the DCPA threshold is preferably in a range of about 2 to 4 dB above the gain value for full-load conditions.

Assuming a 3 dB relative gain at the time of initial configuration, DCPA module 68 will increase the power level of every signal carrier passing through it by 3 dB. This will continue as long as the output power of amplifier 82 (as monitored by detector 84), remains at least 3 dB below the full-load power value. The relative gain is in addition to the gain that would normally be applied to each carrier to properly drive the associated HPA assembly under full-load conditions. When the total loading in the associated repeater approaches the DCPA threshold value (50% in this example), the power output of amplifier 82 will approach the full-load power level represented by reference source 86. At this point, comparator logic 88 commands amplifier 82 to switch to the zero relative gain state, lowering the carriers back to their nominal (non-DCPA aided) values. This eliminates the possibility of over-driving the repeater HPA assembly and attendant signal degradations as traffic loading continues to increase past the threshold level.

The zero relative gain state continues until the repeater loading reverses direction and drops below the DCPA threshold, at which point amplifier 82 is commanded to change to the DCPA relative gain (3 dB) state. Operation continues in this manner automatically and indefinitely in response to the current traffic loading conditions. Of course, sufficient hysteresis is preferably built into the control loop to prevent unnecessary switchings between the gain states. As such, the embedded software and intelligent algorithm of the comparator logic sub-unit should be carefully designed to achieve reliable and stable operation of the DCPA-Driver amplifier.

For ground-based implementations with multiple feeder stations, the operation of DCPA module 68 is under direct control of NDCC 40 through NDCC commands 80. For these applications, comparator logic 88 is placed in a manual mode where it follows the NDCC commands 80 to set the gain of amplifier 82. The NDCC generates commands for DCPA module 68 based on the traffic loading conditions of a particular repeater which may originate from one or more of the feeder earth stations 12. As such, the NDCC selects either the zero relative gain or the DCPA threshold gain based on the DCPA loading threshold of each associated repeater. As described above, prior art systems typically proportionately allocate payload power among the repeater sections and the signal carriers assuming a full-load condition, i.e. the maximum number of carriers are present. During off-peak hours, much of the available payload power is unused and left idle. According to the present invention, this available idle power may be used to improve the quality of service and link availability for those carriers that are actually in use. This is accomplished by the ground-based DCPA which provides for more efficient use of the expensive satellite payload power.

For new systems or those that are in the design and construction stage, the present invention can be integrated with the satellite payload. In such cases the traditional driver amplifier module preceding every HPA amplifier assembly will be replaced by a new DCPA-Driver amplifier module. While traditional driver amplifiers working with single-carrier-saturated transponders employ a measure of automatic-gain-control to keep the HPA driven to saturation against a limited amount of uplink signal attenuations, all multi-carrier demand-assigned satellite systems (as the target of the present invention) operate each repeater or transponder in a linear mode below saturation. In such cases, the driver amplifier cannot be used to react to variations in the level of many uncorrelated input carriers. Therefore, the multi-carrier demand-assigned systems must utilize a single fixed gain at all times for proper operation of the system. The DCPA-driver amplifier module of the present invention will in effect operate with a special gain-control function having a gain value which is determined not by variations in the received level of the collective or individual carriers, but based on the instantaneous loading conditions relative to the maximum permissible loading level. Under nominal conditions, operation of the satellite-based DCPA-Driver amplifier is fully automatic and is done without any input from the NDCC, regardless of the particular ground segment configuration. However, to provide for more accurate operation, and to provide a measure of choice and control in selection of different threshold level values, the driver amplifier module is preferably equipped with both a calibration and a gain-selection capability. The NDCC gain-set command 92 may be used to: (a) disable the DCPA function by resetting the amplifier to its nominal gain position, and (b) select a different DCPA threshold level. Through calibration command 94, DCPA-driver amplifier module 68 can be calibrated for the accuracy of reference source 86 and its overall gain for optimum performance. As will be appreciated by one of ordinary skill in the art, the satellite-based version of DCPA-driver amplifier module 68 is generally designed for RF frequencies rather than the much lower IF frequencies for the ground-based version.

In many satellite systems, the return transmissions from all individual end-user stations back to the feeder earth station(s) will go through one or more satellite repeaters under similar conditions as discussed for the forward direction. In such cases, the return repeater is also sized for its power rating under the full traffic loading conditions. The DCPA of the present invention can also be employed with such repeaters but only as part of the satellite repeater. Similar benefits in terms of improved link quality and availability will also be realized in such cases. A ground-based implementation for the return direction would be very difficult, if at all possible, as the return carriers are transmitted by thousands of end-user stations on an individual basis. As such, the only point where they are accessible as a set is in the satellite.

Figure 5:
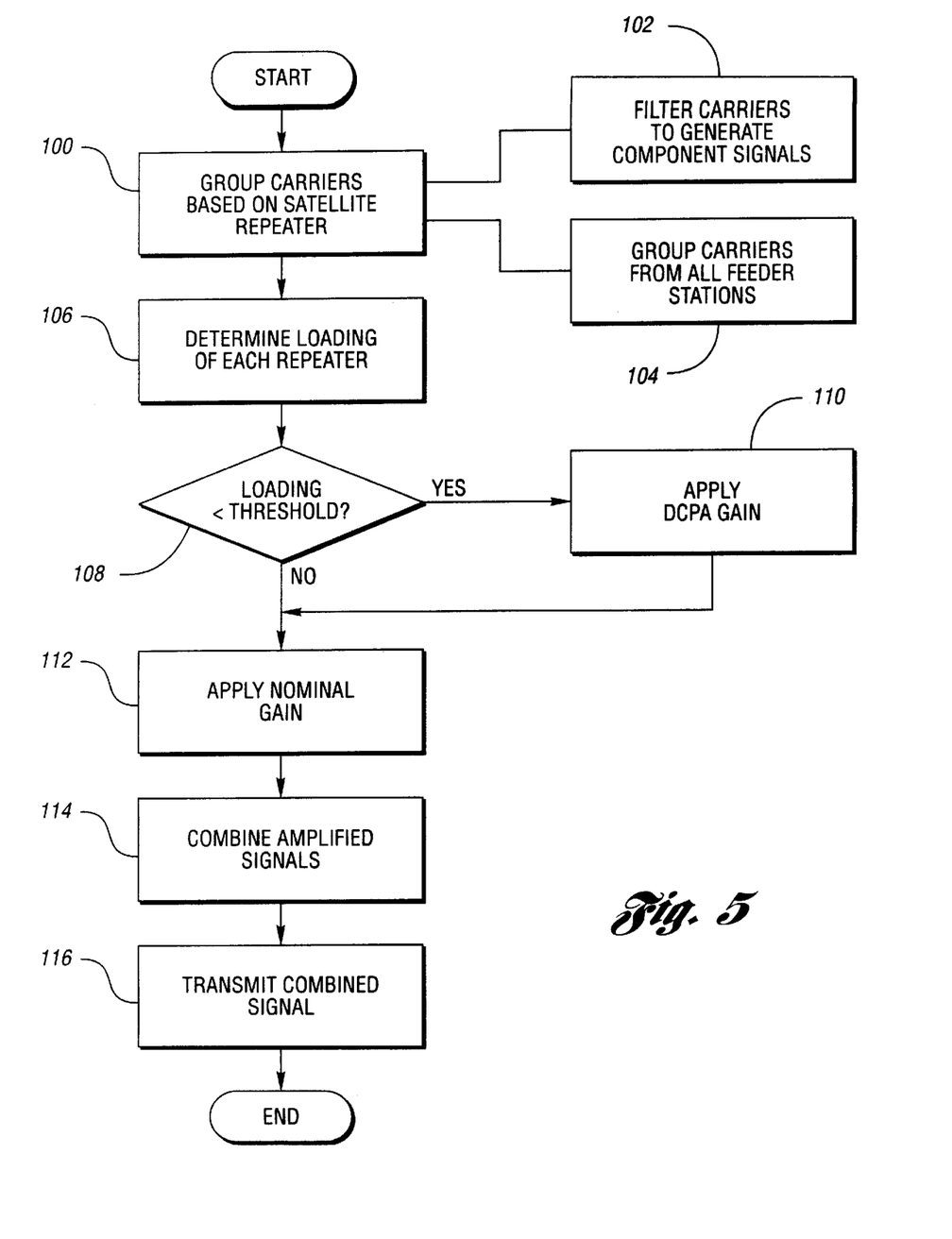
FIG. 5 is a flow chart illustrating a method for improving utilization of satellite payload power according to the present invention.

FIG. 5 illustrates an alternative representation for a system and method of improving utilization of satellite payload power according to the present invention. As will be appreciated by one of ordinary skill in the art, the various functions illustrated in FIG. 5 may be performed in appropriate hardware, software, or a combination thereof. The system and method is illustrated in a consecutive fashion for convenience only. As such, the order of the functions illustrated may not be necessary to accomplish the objects, features, and advantages of the present invention.

Block 100 of FIG. 5 represents grouping of a variable number of user carriers into at least one group of signals corresponding to each satellite repeater. Each group forms a first combined signal which has an associated aggregate signal level. As illustrated and described with reference to FIGS. 1–4, grouping may be performed by filtering the user carriers to generate component signals based on predetermined frequency ranges associated with each repeater, as represented by block 102. When those applications employ more than one feeder earth station, block 100 may include grouping user carriers from all of the feeder earth stations and the corresponding groups where each group corresponds to one of the satellite repeaters, as represented by block 104.

The current loading for each repeater is determined as represented by block 106. If the aggregate loading across all feeder stations for a particular repeater is less than a threshold as represented by block 108, the DCPA gain is applied as represented by block 110. If the current loading for a repeater is above the threshold (with appropriate hysteresis), the additional gain is not applied. Rather, the nominal gain is applied to the signal as represented by block 112. To determine whether the aggregate loading for a particular repeater is greater than the predetermined or adjustable threshold, the combined signal may be compared to a corresponding reference signal as described and illustrated in detail above. When the reference signal exceeds a signal representing the aggregate loading level for a repeater, a predetermined gain is applied as represented by block 110. Note that the nominal gain, represented by block 112, is applied whether or not the increased gain is applied. As such, block 112 represents a zero-relative gain or nominal gain.

The amplified signals are combined to form a second combined signal for transmission to or from the satellite as represented by block 114. The combined signal is then transmitted via the satellite, as represented by block 116. For ground-based implementations, the functions represented in FIG. 5 would be performed within the feeder earth station. Of course, for satellite implementations, the functions of FIG. 5 would be performed by the satellite.

It is to be understood, of course, that while the forms of the present invention described in this document constitute the preferred embodiments of the present invention, the descriptions are not intended to illustrate all possible forms thereof. It is also to be understood that the words used are words of description, rather than limitation, and that in actual practice various changes may be made to meet the needs of every system without departing from the spirit and scope of the present invention, which should be construed according to the following claims.

What is claimed is:

1. A system for improving utilization of satellite payload power in a communication system having at least one uplink signal representing a variable number of user carriers, the uplink signal being transmitted from at least one feeder earth station to at least one end user station via a satellite having at least one repeater, the system comprising:

a splitter to divide the uplink signal into at least one group corresponding to each repeater;

at least one filter set corresponding to each group, the filter set being in communication with the splitter to separate the variable number of carriers by frequency bands corresponding to each group;

at least one combiner in communication with a corresponding filter set for combining carriers associated with each repeater to produce an aggregate signal; and at least one amplifier in communication with a corresponding combiner, the amplifier having a controllable gain based on the aggregate signal such that the gain is increased when the aggregate signal level is below an associated threshold to improve power utilization in the corresponding repeater.

2. The system of claim 1 further comprising:

a signal combiner in communication with all the amplifiers for generating a composite signal.

3. The system of claim 1 wherein the at least one feeder earth station includes a plurality of feeder earth stations, the system further comprising:

a central network controller in communication with the amplifiers for controlling gain of each amplifier based on an aggregate traffic load of the plurality of feeder earth stations corresponding to each repeater.

4. The system of claim 3 wherein the central network controller increases the gain of each amplifier which is below the threshold by about two to four decibels.

5. The system of claim 1 wherein each amplifier applies a nominal gain to the aggregate signal when the aggregate signal is above the threshold and an increased gain when the aggregate signal is below the threshold.

6. The system of claim 1 wherein each of the at least one amplifier comprises:

a detector for sampling output of a corresponding amplifier and generating an output level signal in response thereto;

a reference source for providing a reference signal indicative of a desired level corresponding to the full-load output of the amplifier;

a comparator for comparing the output level signal and the reference signal and generating a gain control signal in response thereto, the gain control signal controlling the gain of the amplifier; and a command receiver for receiving signals from a central network control center to control the gain of the amplifier according to traffic loading by the feeder earth stations.

7. The system of claim 1 wherein the at least one splitter, the at least one filter set, the at least one combiner, and the at least one amplifier are disposed within a satellite.

8. A method for improving utilization of satellite payload power in a communication system using at least one uplink signal representing a variable number of user carriers, the uplink signal being transmitted from at least one feeder earth station to at least one end user station via a satellite having at least one repeater, the method comprising:

grouping the variable number of user carriers into at least one group of signals corresponding to each repeater, each group forming a first combined signal having an associated aggregate signal level;

amplifying each first combined signal having an aggregate signal level below a threshold level; and combining the at least one group of signals to form a second combined signal for transmission via the satellite.

9. The method of claim 8 wherein the step of grouping comprises:

filtering the user carriers to generate a plurality of component signals based on a corresponding plurality of predetermined frequency ranges associated with each repeater.

10. The method of claim 8 wherein the at least one feeder earth station comprises a plurality of feeder earth stations and wherein the step of grouping comprises:

grouping user carriers from all of the plurality of feeder earth stations into a plurality of groups, each group corresponding to one repeater.

11. The method of claim 8 wherein the step of amplifying comprises:

comparing each first combined signal to a corresponding reference signal; and applying a predetermined gain to each first combined signal having a corresponding reference signal which exceeds the aggregate signal level of the first combined signal.

* * * * *